United States Patent
Van Der Veen et al.

(10) Patent No.: US 8,122,260 B2
(45) Date of Patent: Feb. 21, 2012

(54) SHAPING CLASSIFICATION BOUNDARIES IN TEMPLATE PROTECTION SYSTEMS

(75) Inventors: Minne Van Der Veen, Eindhoven (NL); Thomas Andreas Maria Kevenaar, Eindhoven (NL); Alphons Antonius Maria Lambertus Bruekers, Eindhoven (NL); Antonius Hermanus Maria Akkermans, Eindhoven (NL); Franciscus Maria Joannes Willems, Eindhoven (NL)

(73) Assignee: PRIV ID B.V., Eindhoven (NL)

( * ) Notice: Subject to any disclaimer, the term of this patent is extended or adjusted under 35 U.S.C. 154(b) by 1054 days.

(21) Appl. No.: 11/916,094

(22) PCT Filed: May 23, 2006

(86) PCT No.: PCT/IB2006/051646
§ 371 (c)(1),
(2), (4) Date: Nov. 30, 2007

(87) PCT Pub. No.: WO2006/129241
PCT Pub. Date: Dec. 7, 2006

(65) Prior Publication Data
US 2008/0199041 A1    Aug. 21, 2008

(30) Foreign Application Priority Data
Jun. 1, 2005  (EP) .................................... 05104750

(51) Int. Cl.
*G06F 21/00* (2006.01)
(52) U.S. Cl. ....................................................... 713/186
(58) Field of Classification Search ........................ None
See application file for complete search history.

(56) References Cited

U.S. PATENT DOCUMENTS
5,748,780 A    5/1998   Stolfo
(Continued)

FOREIGN PATENT DOCUMENTS
EP    1011285 A1    6/2000
(Continued)

OTHER PUBLICATIONS
Yoshikawa H et al: "A Microcomputer-Based Personal Identification System", Industrial Applications of Microelectronics, Proceedings of the International Conference on Industrial Electronics,Control and Instrumentation, IEEE, vol. 1, pp. 105-109, 1984, XP002039014.

*Primary Examiner* — Brandon Hoffman
(74) *Attorney, Agent, or Firm* — Smith Gambrell & Russell LLP (57) ABSTRACT

The invention relates to a method of authentication of a physical object and an apparatus applying said method. The method uses a helper data (W1) and a control value (V1) associated with a reference object to generate a first property set (C1) using the helper data (W1) and a metric (Y) associated with the physical object. It further comprises a step to generate a second property set (S1) using a noise compensating mapping (NCM) on the first property set (C1), as well as a step to establish a sufficient match between the physical object and the reference object using the second property set (S1) and the first control value (V1). The method is characterized by a step that generates an error measure (ERR) by quantifying the noise removed by the noise compensating mapping (NCM) using the first property set (C1) and information derived from the noise compensating mapping (NCM). Error measure (ERR) is subsequently used for generating an authentication decision (D). Also provided is an apparatus configured to carry out the method.

20 Claims, 5 Drawing Sheets

| U.S. PATENT DOCUMENTS | | | | FOREIGN PATENT DOCUMENTS | | |
|---|---|---|---|---|---|---|
| 6,594,386 B1 | 7/2003 | Golshani et al. | | EP | 1058210 A2 | 12/2000 |
| 6,718,068 B1 | 4/2004 | Gindele et al. | | WO | 0016265 | 3/2000 |
| 7,237,115 B1 * | 6/2007 | Thomas et al. ............. 713/176 | | WO | 0201855 A2 | 1/2002 |
| 2001/0022857 A1 | 9/2001 | Kondo et al. | | WO | 03091939 A1 | 11/2003 |
| 2004/0049687 A1 | 3/2004 | Orsini et al. | | WO | 2004104899 A2 | 12/2004 |
| 2004/0243356 A1 | 12/2004 | Duffy et al. | | | | |

* cited by examiner

SHAPING CLASSIFICATION BOUNDARIES IN TEMPLATE PROTECTION SYSTEMS

The invention relates to a method of authentication of a physical object using both a helper data and a control value associated with a reference object; the method including: generating a first property set using information comprising the helper data and a metric associated with the physical object, generating a second property set using a noise compensating mapping on information comprising the first property set, establishing a sufficient match between the physical object and the reference object using the second property set and the first control value.

The invention further relates to an apparatus for authentication of a physical object using both a helper data and a control value associated with a reference object further comprising: a first generation means arranged to generate a first property set using information comprising the helper data and a metric associated with the physical object, a second generation means arranged to generate a second property set using a noise compensating mapping on information comprising the first property set, a comparing means arranged to generate a sufficient match between the physical object and the reference object using the second property set and the first control value.

Identification and authentication are commonly used techniques for establishing identity. Identity could be the identity of a person or an object. Prime examples of application areas for identification and authentication are access control for buildings, (e)passports, access control for documents or information in general, authorization of payments and or other transactions.

During the process of authentication an object with an alleged identity is offered for authentication. Subsequently characteristics of the object offered for authentication are matched with those of the enrolled object with the alleged identity. If a sufficient match is found the identity of the object being authenticated is said to be the alleged identity. Authentication thus deals with matching one object being authenticated to one enrolled object based on the alleged identity.

In practical authentication systems the authentication process is generally preceded by an enrolment process. During this enrolment process characteristics of the object at hand are measured and stored. Based on the measured data so-called template data is generated for the object. This template data is used during the authentication process for matching enrolled objects with the measured characteristics.

Template data may at first glance present little value. However when this data is used on a regular basis to perform financial transactions its value becomes obvious. Furthermore in case of biometric authentication systems template data may also comprise privacy sensitive biometric data, and therefore have an even greater value. In classical system template data is generally unprotected, and thereby susceptible to malicious attacks.

International application WO 2004/104899 (PHNL030552) discloses a solution to this problem, in the form of template protection for authentication of a physical object.

In an authentication system with template protection a so-called helper data and a control value are used for authenticating a physical object. Both are generated during enrolment and are used instead of the actual template data. The helper data is generated using the template data, but characteristics of the template data are obfuscated in such a way that there is hardly any correlation between the template data and the helper data. The control value is generated in parallel with the helper data and serves as a control value for the authentication process.

The helper data and control value are used during authentication. First the helper data is combined with data acquired from the physical object (e.g. facial feature data). The combined data is subsequently "condensed" into a second control value. This second control value is matched with the control value generated during enrolment. When these control values match the authentication is said to be successful.

The authentication process verifies whether the metric obtained from the physical object during authentication sufficiently matches the template data. Assume the physical object is the same as the reference object, the combined data (helper data and metric data) are passed to a noise compensating mapping to compensate for measurement noise in the metric data.

The noise compensating mapping determines to a large extent whether or not a sufficient match is found between the physical object and the reference object. Consequently the classification boundaries of a helper data system, that determine whether an object matches or not, are primarily determined by characteristics of the noise compensating mapping used. In a conventional helper data system where two objects substantively resemble one another, such that the classification boundaries for the individual objects overlap, it is not possible to differentiate between noise and differentiating features for these objects.

It is an object of the present invention to provide a method that allows the shaping of classification boundaries of individual objects in a template protected authentication system, thereby allowing the effective elimination of overlapping classification boundaries.

This objective is realised in that the method as set forth in the introductory paragraph is characterized in that it further comprises the following steps: generating an error measure by quantifying the noise removed by the noise compensating mapping using the first property set and information derived from the noise compensating mapping, and using said error measure for generating an authentication decision.

Authentication methods that employ template protection by means of helper data comprise a noise robust mapping applied during enrolment for generating the helper data and a noise compensating mapping applied during authentication. The noise robust mapping is used to provide resilience to measurement errors in the (bio)metric data acquired from the physical object. The noise compensating mapping can be interpreted as the inverse of the noise robust mapping, where the noise robust mapping adds noise resilience, the noise compensating mapping uses this to reconstruct the original message in the presence of noise. Provided the noise robust mapping is sufficiently robust, or the measurement noise is sufficiently small, successful authentication is possible. The noise robust mapping effectively determines the classification boundaries of such authentication methods.

The present invention uses the input and output of the noise compensating mapping to quantify an error measure that can be used to further contract the classification boundaries of the authentication method by specifying additional constraints based on said error measure. By applying such constrains it is possible to further differentiate between objects that otherwise could result in a false positive authentication.

The same error measure that can be used for shaping the classification boundaries can be used to establish a probability measure indicative of the probability of a false positive. A straightforward way to establish such a probability measure is to use the number of symbol errors corrected by the noise robust mapping and divide that by the maximum number of symbol errors that the noise robust mapping can correct. The resulting ratio is indicative of the chance of a false positive.

This probability measure can also be used for making soft decisions. Soft decisions are particularly advantageous in multi-modal authentication systems, where the result from the template protected authentication system is combined with the results of other authentication methods. Combining probabilities instead of bi-exact decisions can contribute significantly to the overall quality of the decision.

A further beneficial application of the present invention is application in an authentication method in which multiple candidate objects are compared to the metric data, thereby establishing whether there are other objects that present a better match than the alleged identity.

An alternate advantageous application is to apply the steps as presented for the method of authentication in a method of identification of a physical object. Identification can be interpreted as a repeated authentication process, where multiple objects from the set of enrolled objects are matched with the physical object. An identification method further requires an additional step to select the best match, or most likely reference object/identity out of all matching reference objects/identities.

In an identification method employing helper data multiple reference objects could be found in the enrolment database whose helper data in conjunction with the (bio)metric Y result in the same second property set. If this is the case a further selection step is needed. By employing the steps according to the present invention, a noise measure can be established, or a probability measure. These can be used in the final selection step, by selecting the reference object/identity that resulted in the smallest noise measure, or selecting the most likely reference object/identity.

The present method can also be applied in an advantageous fashion in multi-modal identification methods. As illustrated above, an identification method applying helper data can create a set of matching objects and accompanying probability measures. These probability measures provide additional differentiating information over the actual identification decisions. By combining candidate sets and probability measures from the individual methods that make up the multi-modal identification method it is possible to make a more reliable identification decision.

This objective is further realised in that the apparatus as set forth in the second paragraph further comprises a third generation means arranged to generate an error measure by quantifying the noise removed by the noise compensating mapping using the first property set and information derived from the noise compensating mapping, and an authentication decision means arranged to use said error measure to generate an authentication decision.

These and other aspects of the biometric authentication system will be further elucidated and described with reference to the drawing, in which.

Throughout the drawing, the same reference numeral refers to the same element, or an element that performs the same function.

Although the present invention is described primarily for use in authentication systems, the present method can be applied to identification systems in an equally advantageous way.

During the authentication process typically a metric obtained from a physical object with an alleged identity is matched with enrolment data associated with a reference object with the alleged identity. During an identification process typically a metric obtained from a physical object without an alleged identity is matched with enrolment data associated with a series of reference objects to establish an identity.

Both processes effectively perform a comparison of a metric obtained during authentication/identification, and compare this with enrolment data of at least one reference object. Although the examples focus primarily on issues related to the authentication process, a person skilled in the art is able to design alternative embodiments for the identification of a physical object without departing from the scope of the appended claims.

Figure 1:
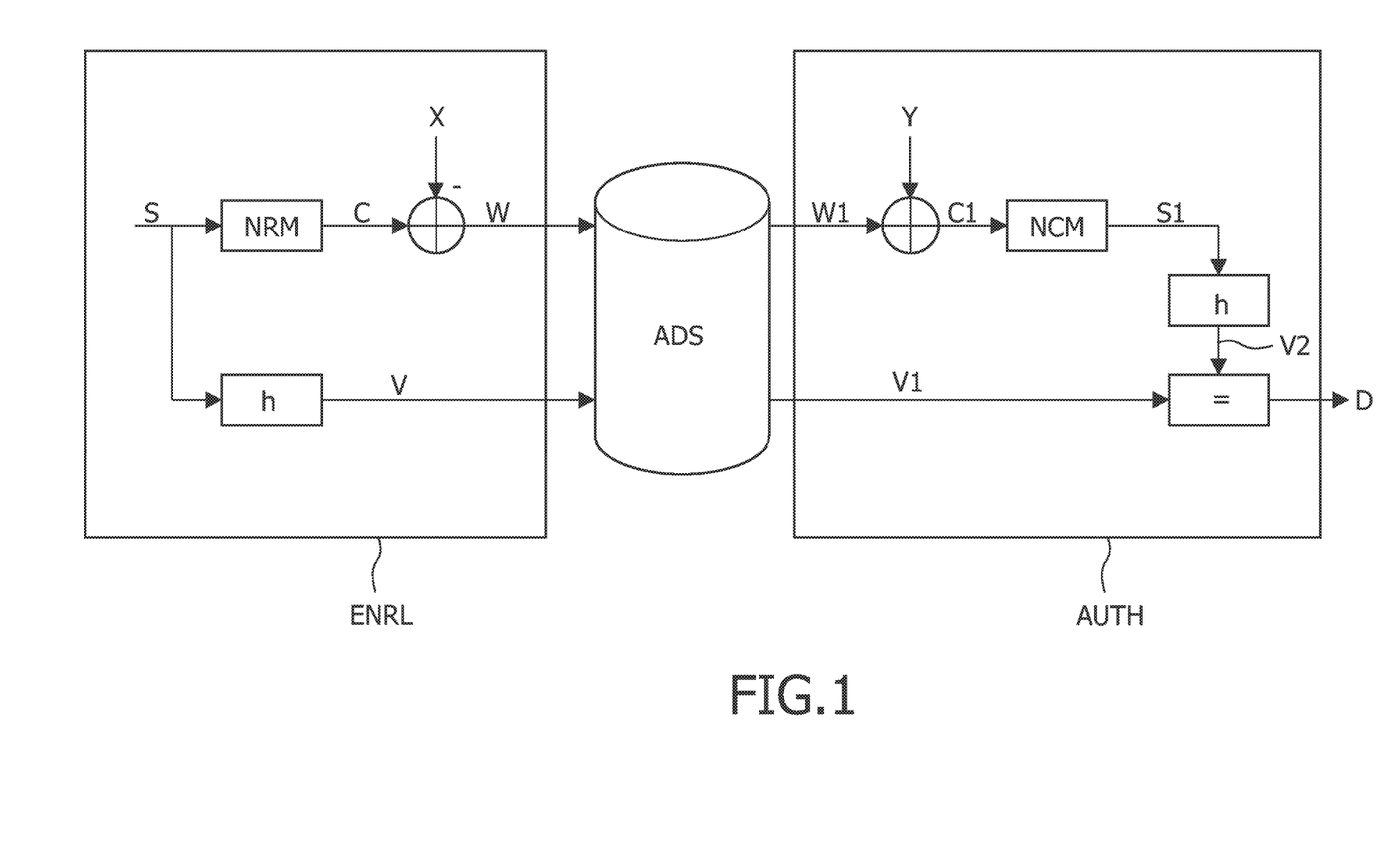
FIG. 1 is a block diagram of the enrolment and authentication process in an authentication system for a physical object employing template protection according to the prior art.

Before explaining the present invention in more detail the general concept of an authentication system applying template protection is further elucidated using the block diagram in FIG. 1. FIG. 1 depicts an enrolment process ENRL on the left hand side, during the enrolment process ENRL a helper data W and a control value V are generated for the object being enrolled. This data is subsequently stored in the authentication data set ADS, located in the middle. During the authentication process AUTH, depicted on the right hand side, a physical object (not shown in FIG. 1) with an alleged identity is authenticated.

Initially the authentication data set ADS is searched for a reference object with the alleged identity. If there is no such reference object the authentication will fail. Provided the reference object is found, a first helper data W1 and an accompanying first control value V1 associated with the alleged identity are retrieved from the authentication data set ADS. This data is used to decide whether or not the physical object being authenticated sufficiently matches the reference object, resulting in a positive authentication.

Assume that the helper data system is used to authenticate persons using biometric data in the form of fingerprint data. Furthermore assume that the biometric template data comprises a graphical representation of the lines and ridges of the core area of the fingerprint. Issues such as the orientation and localization of the core area during acquisition are beyond the scope of the present description.

During the enrolment process ENRL a person presents his or her finger to a fingerprint scanner. The result from one or more fingerprint scans is used to construct a biometric template X. In addition, a possibly secret property set S is chosen.

The property set S is mapped onto a property set C by means of a noise robust mapping NRM.

Subsequently the property set C is combined with biometric template X to produce a helper data W. In a practical helper data system the property set S and the noise robust mapping NRM are chosen such that the resulting helper data W does exhibit little or no correlation with the biometric template data X. As a result the use of helper data W does not expose the biometric template data X to malicious users.

To enable authentication the enrolment process also involves the generation of a control value V. Control value V is generated using the property set S. Although the control value V can be identical to the property set S this is not advisable in systems where security is an issue. In a secure helper data system it should not be possible to reconstruct the property set S using the control value V. This requirement is satisfied when the control value V is generated by application of a one-way mapping on the property set S. A cryptographic hash function is a good example of such a one-way mapping. If security is not critical a non one-way mapping could be used. Finally the pair of helper data W and control value V are stored in the authentication data set ADS.

Although a particular object can be identified using a single pair of helper data W and control value V, it is possible that a particular object can be identified using multiple pairs of helper data and control values. Additional helper data and control value pairs can be generated easily by selecting different property sets S. Multiple helper data and control value pairs can be particularly useful for managing access levels or for system renewal. For now assume a situation in which the authentication data set comprises only a single helper data and control value per enrolled object.

During the authentication process AUTH a biometric data Y (fingerprint) from a physical object (not shown in FIG. 1) is acquired. In addition an alleged identity is provided. The next step is to check whether the authentication data set ADS contains a first helper data W1 and a first control value V1 for a reference object with said alleged identity. If this is the case the first helper data W1 and the first control value V1 associated with the reference object are retrieved.

Next the biometric data Y from the physical object is combined with the first helper data W1 resulting in a first property set C1. In case the physical object corresponds to the reference object the biometric data Y can be interpreted as a noisy version of the biometric template X:

$$Y = X + E \quad \text{(where E is small)}$$

The first helper data W1 can be represented by template data X and property set C:

$$W1 = C - X$$

By substitution the first property set C1 can be written as:

$$C1 32 C - X + Y$$

$$C1 = C - X + X + E$$

$$C1 = C + E$$

The first property set C1 is passed to the noise compensating mapping NCM to produce a second property set S1. Now assume that the reference object corresponds with the physical object. As long as the noise component E present in the biometric data Y is sufficiently small, or alternatively the noise robust mapping NRM is sufficiently robust, the noise compensating mapping NCM will reconstruct a second property set S1 that is identical to the original property set S as used during enrolment for generating the first helper data W1.

The first property set SI is subsequently used to compute a second control value V2 in a similar fashion as the first control value V1. Next second control value V2 is compared with the first control value V1 generated during enrolment. Provided the noise robust mapping NRM provides sufficient resilience to noise the second control value V2 will be identical to the first control value V1. If these values are identical, the authentication is successful, and the identity of the physical object is established as being the alleged identity.

The noise robust mapping NRM can be selected from a wide variety of mappings. A simple noise robust mapping NRM could involve the duplication of input symbols. In turn the noise compensating mapping NCM would require a majority vote using the received symbols. On the other end of the spectrum a more elaborate noise robust mapping NRM can be selected such as a Reed Solomon Error Correcting Code encoder.

Figure 2:
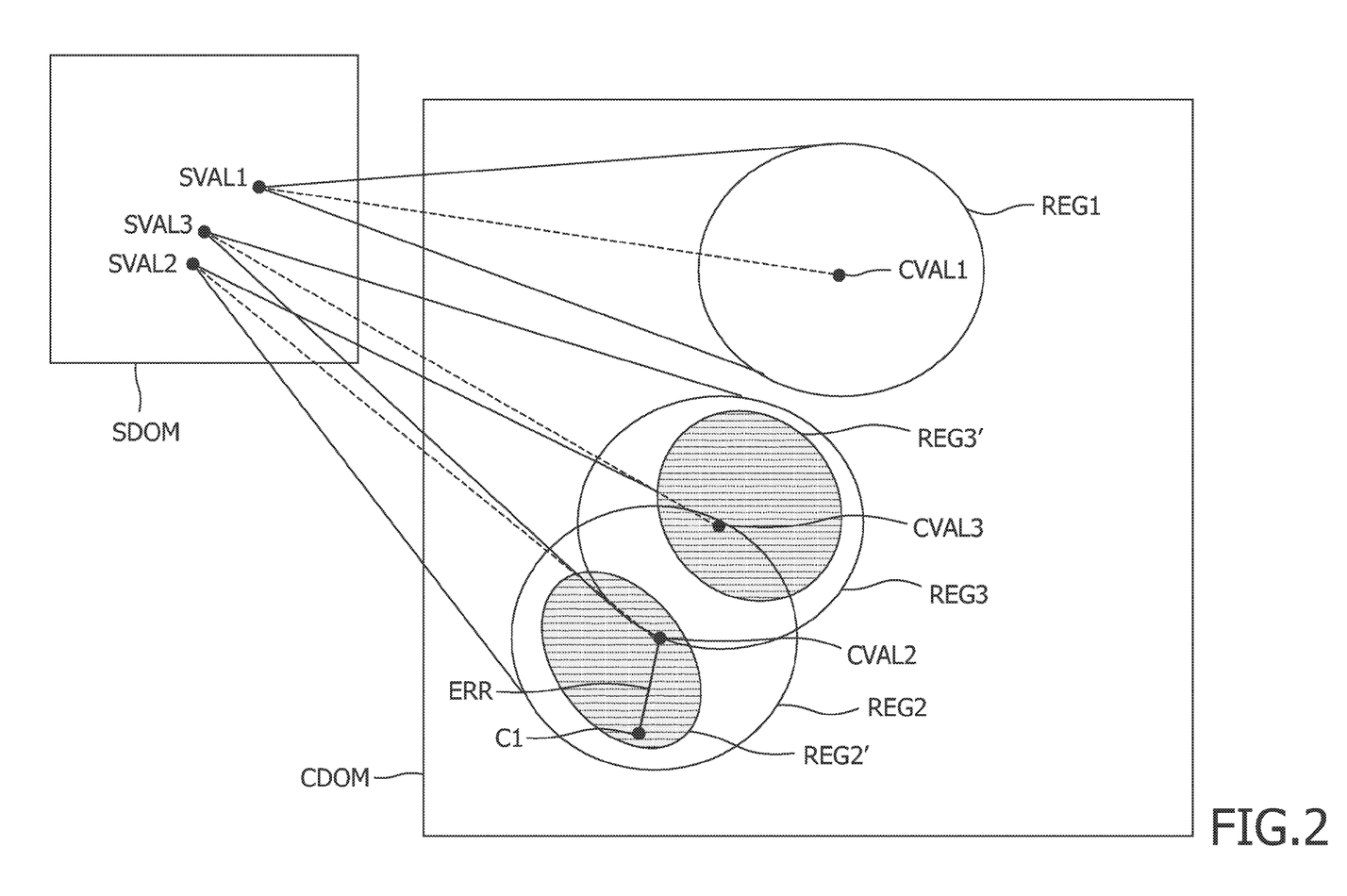
FIG. 2 is a graphical representation of soft matching and classification boundary shaping according to the present invention.

The graphical representation in FIG. 2 illustrates how the present invention can be used to shape the classification boundaries of an authentication system employing template protection. FIG. 2 shows two different domains the S-domain SDOM, and the C-domain CDOM.

The S-domain SDOM is a two-dimensional projection of a potentially N-dimensional space that holds potential elements of the property set S chosen during the enrolment phase. The C-domain CDOM is a two-dimensional projection of a potentially M-dimensional space that holds potential elements corresponding with property set C.

During authentication a first helper data W1 associated with the alleged identity is combined with a metric Y from the physical object to produce a first property set C1. By applying a noise compensating mapping on the first property set C1 a second property set S1 is obtained. In case of a successful authentication the second property set S1 corresponds to the property set S used during enrolment.

Consider a particular object OBJ1 (not shown). During the enrolment of object OBJI a property set SVAL1 is chosen. The property set SVAL1 is used to generate a property set CVAL1 that in turn is used to generate helper data. During authentication of this object with the correct alleged identity this helper data will be retrieved and combined with a metric obtained from the object into the first property set C1.

Due to measurement noise the first property set C1 will generally not be identical to the property set CVAL1. The noise compensating mapping will attempt to compensate for that noise using the noise resilience added by the noise robust mapping. The region REG1 corresponds to all property sets that will be mapped onto SVAL1 by the noise compensating mapping. Thereby the circle REG1 corresponds to the classification boundary for this particular object.

The regions REG2 and REG3 depicted in FIG. 2 are associated with two other objects OBJ2 and OBJ3 respectively (not shown). Again the circles correspond to the classification boundaries used by the system for the respective objects.

The regions REG2 and REG3 overlap, this implies that property set values located in the intersection of REG2 and REG3 will result in a successful authentication for both objects. Although this does not present an obstacle for authentication, where an object is matched to a single reference object, it does present a serious issue for identification.

The present method provides a solution to this problem by quantifying an error measure ERR between the first property set C1 generated during authentication and CVAL2 or CVAL3 respectively. Subsequently additional constraints can be added to this error measure ERR for each particular object, thereby contracting the classification boundaries for that particular object as indicated by REG2' and REG3' respectively.

By careful selection the classification boundaries can be contracted such that there is no more overlap between the regions.

As indicated by REG2' and REG3' classification boundaries can be shaped for each individual object using constraints. These constraints can be unique for each individual object and can be stored in combination with their respective helper data and control value in the authentication data set ADS.

The error measure ERR and associated constraints can be either scalar or vector based. The obvious advantage of using a vector is that multiple individual constraints can be set to vector elements, thereby facilitating more detailed classification boundary shaping. Apart from thresholds the constraints could also comprise thresholds to combinations of vector coefficients thereby modeling relations between vector coefficients.

Although the classification boundaries in FIG. 2 are of similar size this is not a prerequisite of the present method. The shape and size of the regions are determined primarily by the noise robust mapping NRM and need not be identical for all values in the C-domain CDOM.

Figure 3:
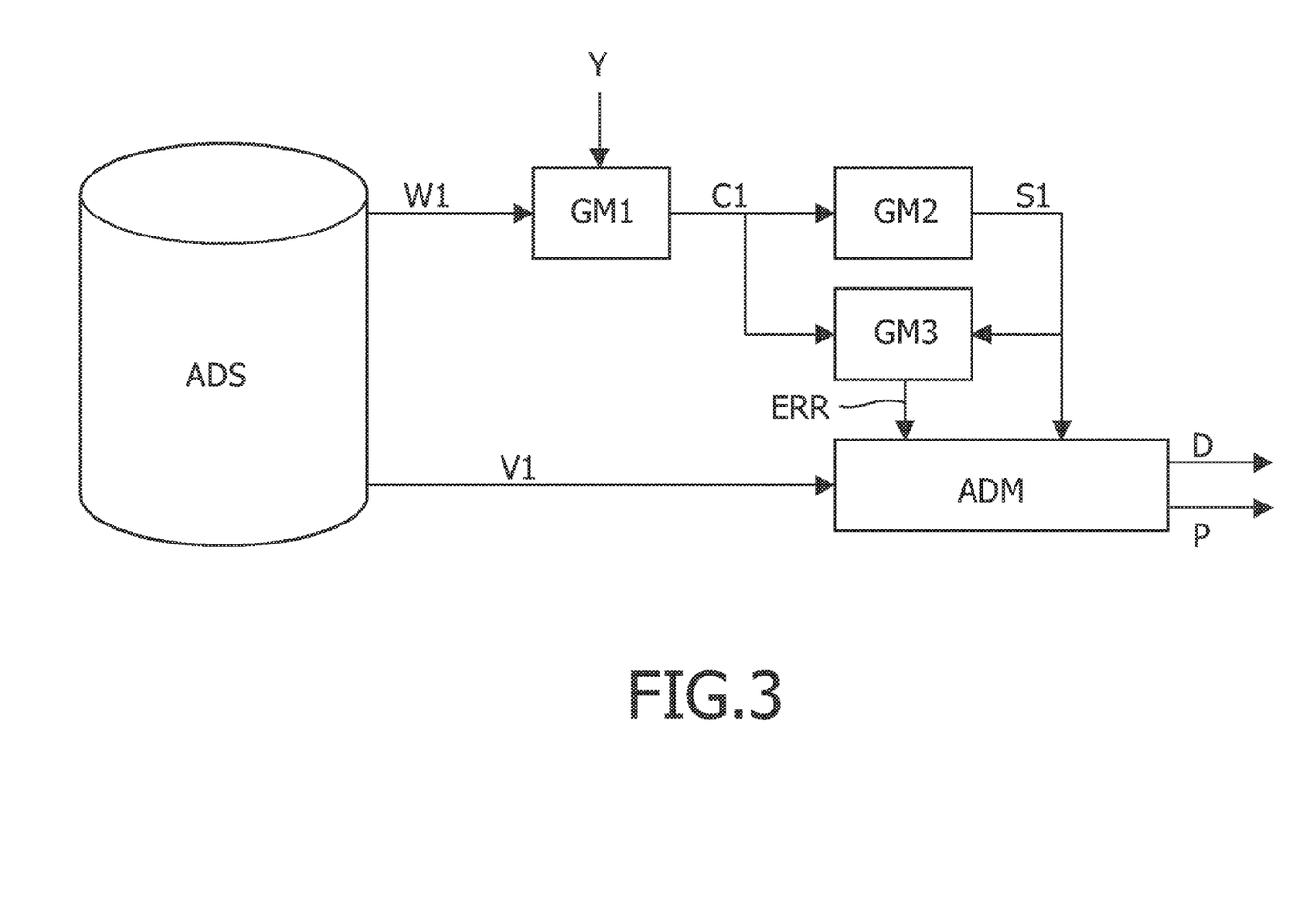
FIG. 3 is a block diagram of an apparatus for authentication of a physical object employing template protection according to the present invention.

FIG. 3 presents a block diagram of an apparatus for authentication of a physical object employing template protection according to the present invention.

During the authentication process a first helper data W1 and a control value V1 are obtained from the authentication data set ADS. The first generation means GM1 generates the first property set C1 using the first helper data W1 and a metric Y obtained from the physical object (not shown). The second generation means GM2 subsequently generates the second property set S1 by applying a noise compensating mapping NCM on the first property set C1. The third generation means GM3 subsequently combines the first property set C1 and the second property set S1 into an error measure ERR.

Figure 4:
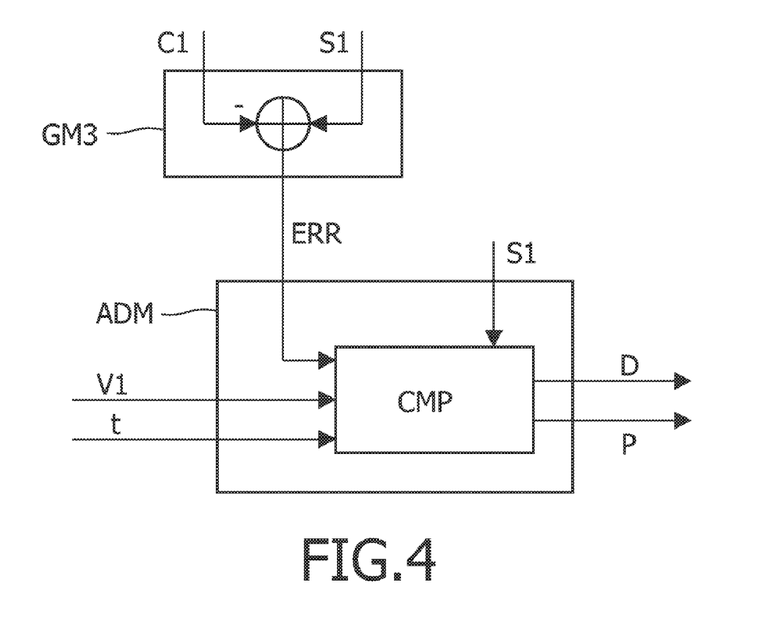
FIG. 4 is a block diagram of an implementation of a subsection of an apparatus for authentication of a physical object employing template protection according to the present invention.
Figure 5:
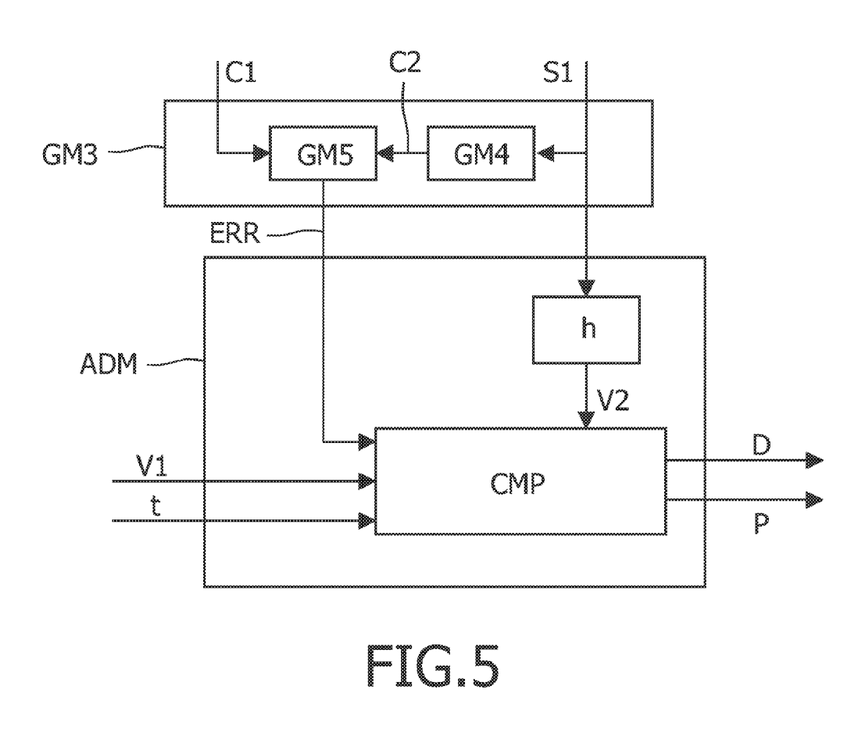
FIG. 5 is a block diagram of an alternate implementation of a subsection of an apparatus for authentication of a physical object employing template protection according to the present invention.
Figure 6:
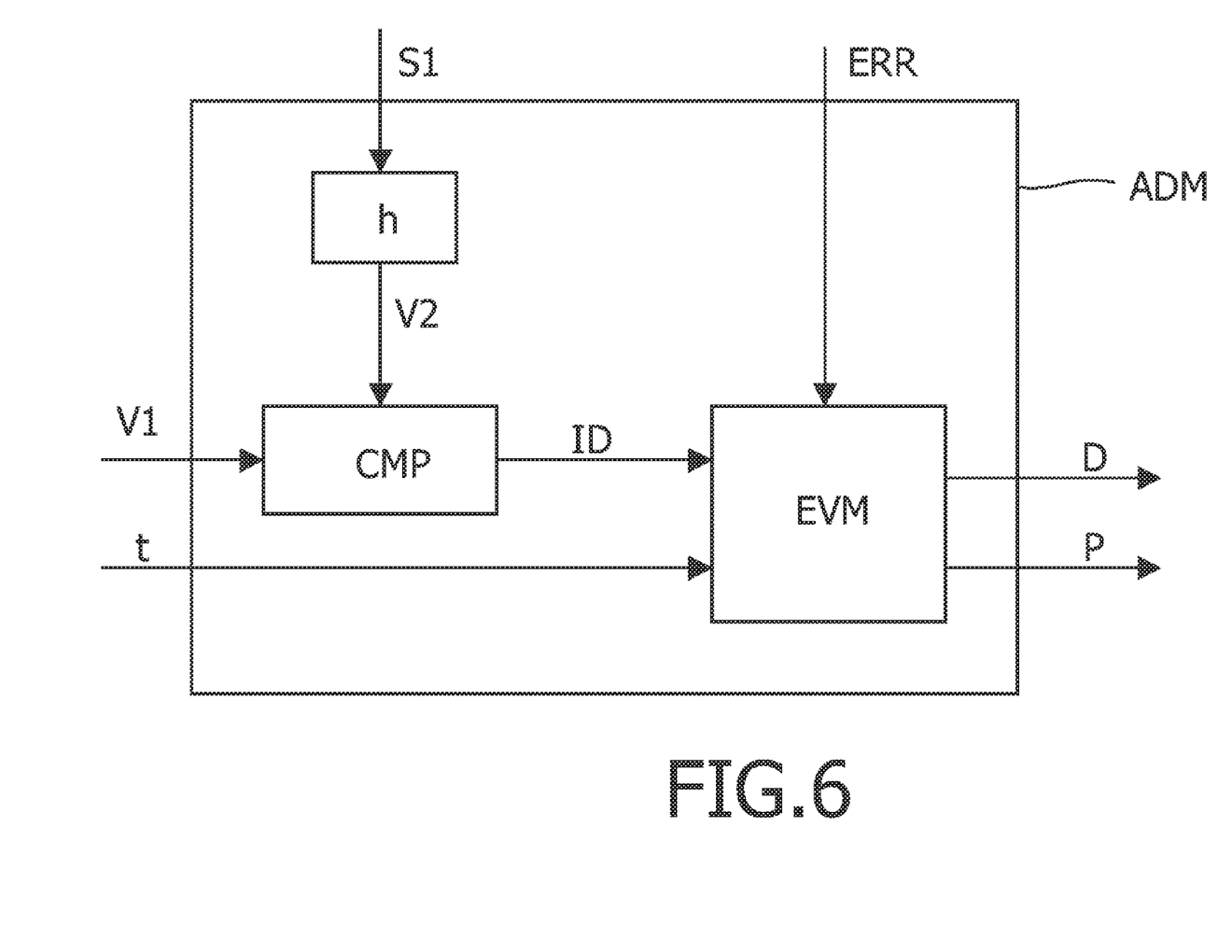
FIG. 6 is a block diagram of an alternate implementation of an authentication decision means as used by an apparatus for authentication of a physical object employing template protection according to the present invention.

The error measure ERR together with the second property set S1 and the control value V1 are inputs to the authentication decision means ADM that generates a decision D and a probability measure P related to that decision. FIGS. 4, 5, and 6 provide further details with respect to the third generation means GM3 and the authentication decision means ADM.

The noise robust mapping NRM is at the heart of the present invention. During authentication characteristics of the noise robust mapping NRM are used to help shape the classification boundaries used in the authentication decision means ADM. Error Correcting Code encoders, or ECC encoders are good examples of noise robust mappings.

In general ECC encoders are used to add redundancy to messages to facilitate message extraction after operations that inject noise into the message. ECC encoders can be classified in a variety of ways the classification used here distinguishes two classes:
1. ECC codes where input and output code-words
    consist of symbols from the same alphabet,
    input and output have a similar format.
2. Other ECC codes.

Systematic ECC codes are members of the first class. When a message is encoded by means of a systematic ECC encoder the message is copied unaltered into the codeword, and the parity bits are effectively appended to the message. A systematic ECC decoder in turn maps the input codeword consisting of the concatenated message and parity bits onto a new corrected codeword of the same format.

This particular quality makes members of the first class prime candidates for the noise robust mapping NRM. During enrolment property set S is used as the message part and parity bits are appended resulting in a code word; property set C.

During authentication a first property set CI is generated using the first helper data. The property set CI can be seen as the property set C with a superimposed noise component. Provided that the noise component is small enough, or the ECC used robust enough the first property set C1 can be successfully corrected by means of the ECC decoder.

Establishing an error measure between the input and output code words for members of the first class of ECC codes can be as simple as subtracting the ECC decoder input from the ECC decoder output. FIG. 4 shows a block diagram of a subsection of an apparatus according to the present invention that exploits these characteristics. The top part of FIG. 4 depicts a simple third generation means GM3. The third generation means GM3 generates an error measure ERR by subtracting the first property set C1 from the second property set S1.

The error measure in turn is sent to a comparator CMP in the authentication decision means ADM. This particular authorization decision means ADM performs three steps:
1. It compares the first control value V1 with information derived from the first property set S1 to establish whether the noise compensating mapping NCM was able to reconstruct the property set S used during enrolment.
2. It applies additional constraints on the error measure ERR to establish a decision D.
3. It establishes a probability measure P, representing the likelihood that the decision D is correct.

The first step corresponds to the step in a conventional helper data system where a sufficient match is established between control value V1 and information derived from second property set S1. In case security of the system is not relevant the control value V1 could be identical to the second property set S1.

However exposing the second property set S1 presents a security risk as it allows the reconstruction of the template data by a malicious user. Alternatively the control value V1 could be generated by means of a one way function, such as a cryptographic hash, in doing so authentication remains possible without exposing the second property set S1.

Once it is clear that the second property set S1 generated during authentication is identical to the property set S, thereby acknowledging that the error measure ERR is reliable, the error measure ERR can be used to further contract the classification boundaries; the second step.

Error measure ERR constraints can vary with the error measure ERR. When the error measure ERR is of a scalar nature, such as the number of symbol errors in the first property set C1, a further restriction could be imposed that requires the number of bit errors to be smaller than a predetermined scalar threshold t.

Alternatively when the system is arranged to generate a vector error measure ERR a further restriction could be imposed that requires the individual coefficients have to be smaller than accompanying predetermined values, which in turn could be represented using a predetermined threshold vector t.

Finally the pre-determined threshold t may consist of both threshold values for coefficients, as well as threshold for combinations of vector coefficients, thereby accounting for relations between respective vector coefficients. These thresholds can be individually determined, and stored in the authentication data set in conjunction with the first helper data W1 and first control value V1.

Based on the both the results from the first two steps a decision D can be formed that is subsequently used as the authentication decision. The third step generates a probability measure P related to the decision D. The probability measure P effectively provides additional information that can be used for further processing together with or even instead of the decision D.

The apparatus in FIG. 3 addresses authentication, but with minor enhancements could be used for identification. In case of identification multiple objects from the authentication data set ADS, are compared with the metric data Y acquired from the physical object. In case of identification the physical object being identified does not provide an alleged identity. Instead the identity of the physical object can be derived from the identity of the reference object that provides a sufficient or best match. To this end the apparatus can be extended with an identity establishing means, that can retrieve the identity of the reference object from the authentication data set ADS, and can, based on the decision D and or the probability P, establish the identity of the physical object to be identical to that of the reference object.

FIG. 4 illustrates how the authentication decision means ADM can generate such a probability measure P. The number of symbol errors corrected by the noise compensating mapping NCM could be used as an indication of a probability measure. If needed this particular measure can be normalized by dividing through the maximum number of errors that the noise robust mapping can compensate.

The probability measure P that is based on the error measure ERR is only valid when the error measure ERR is valid, that is when the first step of the authentication decision means ADM is successful.

The three steps described here are representative of an embodiment according to the invention, but not limiting. The individual steps for generating a decision D and the accompanying probability measure P can be combined. A simple way to combine these steps would be to establish a probability measure, e.g. through careful weighing of errors of individual vector coefficients, and subsequently using the probability in conjunction with a pre-determined threshold to determine whether the authentication decision should be positive or negative.

The apparatus depicted in FIG. 5 resembles that in FIG. 4 but includes an alternate implementation of a third generation means GM3 and an authentication decision means ADM. The key difference with respect to the third generation means GM3 being that the implementation of the third generation means GM3 in FIG. 5 can be used for error correcting codes of both classes of ECC as mentioned earlier.

To this end the third generation means GM3 comprises a fourth generation means GM4 that generates a third property set C2 by applying the noise robust mapping NRM on the second property set S1. Regardless of the requirements of the input and output of the noise robust mapping NRM, the third property set C2 has the same format as that of the first property set C1. Subsequently a fifth generation means GM5 can subtract the first property set C1 from the third property set C2 to obtain an error measure ERR for both classes of ECC codes.

In addition FIG. 5 also depicts how a secure apparatus for authentication of a physical object employing template protection can generate a second control value V2 from the first property set S1 using a one-way function h.

Although the focus has been primarily on shaping classification boundaries the present invention can also be used for generating soft-decisions. A system applying soft-decisions capitalizes on the fact that the probability measure P comprises more information than the decision D.

This additional information can be used in multi-modal identification systems. Instead of determining a single matching object, or a list of matching objects it is possible to provide a list of matching objects with probabilities. These probabilities can be used as differentiating factors when combining the results with the other parts of the multi-modal system. Due to the additional information/resolution provided by the probability measures the identification process can be made more reliable.

FIG. 6 depicts an implementation of an authentication decision means ADM that can be used in an embodiment of the present invention. The authentication decision means ADM uses a two-stage approach, in the first stage an interim decision ID is established based on the a control value V1 and a second control value V2 derived from the second property set S1.

The interim decision ID is subsequently passed to an evaluation means EVM, where subsequently the error measure ERR is compared with a predetermined threshold t. Based on this comparison the evaluation means EVM can subsequently reject or accept a positive interim decision ID to obtain a decision D.

Although the present invention was illustrated using examples that apply a single first helper data W1 and a first control value V1, the present invention can be used advantageously in systems that apply multiple pairs of helper data and control values to authenticate physical objects.

As additional constraints based on the error measure ERR only allow contraction of classification boundaries. The use of multiple pairs of helper data and control values allow the extension of classification boundaries, and thereby facilitates true shaping, contraction and extension, of the classification boundaries for objects.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An authentication apparatus for authentication of a physical object comprising
an enrollment means (ENRL), and
an authentication means (AUTH), wherein
said enrollment means are arranged in
measuring reference characteristics of said physical object;
generating and storing template data based on said measured reference characteristics;
generating and storing a helper data (W1) based on said template data
generating and storing a control value (V1);
the authentication means being arranged in:
obtaining a metric (Y) from the physical object to be authenticated;
and further comprising:
a first generation means (GM1) arranged to generate a first property set (C1) using the helper data (W1) and the metric (Y) obtained from the physical object, a second generation means (GM2) arranged to subject said first property data set (C1) to a noise compensating mapping (NCM) to compensate for measured noise in said metric (Y) thereby generating a second property set (S1), a comparing means (CMP) arranged to establish a sufficient match between the physical object and the reference object, by verifying whether the second property set (S1) is within a classification boundary (REG1) of the reference object using the first control value (V1) and wherein a noise robust mapping (NRM) determines the classification boundary, the authentication apparatus characterized in that it further comprises:

a third generation means (GM3) arranged to generate an error measure (ERR) by quantifying the noise removed by the noise compensating mapping (NCM) using the first property set (C1) and the second property set (S2), and an authentication decision means (ADM) arranged to use said error measure (ERR) to generate an authentication decision (D).

2. An authentication apparatus as claimed in claim 1, where the third generation means (GM3) is arranged to generate an error measure (ERR) that quantifies the difference between the first property set (C1) and the second property set (S1).

3. An authentication apparatus as claimed in claim 1, where the third generation means (GM3) arranged to generate an error measure (ERR) comprises:

a fourth generation means (GM4) arranged to generate the third property set (C2) using the noise robust mapping (NRM) on information comprising the second property set (S1), and a fifth generation means (GM5) arranged to generate the error measure (ERR) by quantifying the difference between the first property set (C1) and the third property set (C2).

4. An authentication apparatus as claimed in claim 1, where the authentication decision means (ADM) is arranged to use information comprising the error measure (ERR) and the first control value (V1) associated with both the reference object and the helper data (W1), to generate the authentication decision (D) identifying whether the physical object corresponds with the reference object.

5. An authentication apparatus as claimed in claim 1, where the authentication decision means (ADM) is arranged to use information comprising the error measure (ERR) and the first control value (V1) associated with both the reference object and the helper data (W1), to generate a probability measure (P) related to the authentication decision (D).

6. An authentication apparatus for identification of a physical object using both a helper data (W1) and a control value (V1) associated with a reference object, the apparatus according to claim 1, further comprising an identity establishing means arranged to establish the identity of the physical object as being identical to that of the reference object.

7. A computer controlled method suitable of authentication of a physical object in a system employing template data protection, comprising an enrollment process consisting of the steps of:

measuring reference characteristics of the physical object;
generating template data based on said measured reference characteristics;
generating a helper data (W1) based on said template data
generating a control value (V1);

the method further including an authentication process consisting of the steps of obtaining a metric (Y) from the physical object to be authenticated;
generating a first property data set (C1) based on the helper data (W1) and the metric (Y),
subjecting said first property data set (C1) to a noise compensating mapping (NCM) to compensate for measured noise in said metric (Y) thereby;
generating a second property data set (S1),
for authenticating purposes of the physical object verifying whether the second property data set (S1) is within a classification boundary (REG1) of the reference object using the first control value (V1) and wherein a noise robust mapping (NRM) determines the classification boundary, the method characterized in that it further comprises the following steps:

generating an error measure (ERR) by quantifying the noise measured in said metric (Y) by the noise compensating mapping (NCM) using the first property set (C1) and the second property set (S2), and generating an authentication decision (D) using said error measure (ERR).

8. A computer controlled method as claimed in 7, where the step for generating the error measure (ERR) comprises quantifying the difference between the first property set (C1) and the second property set (S1).

9. A computer controlled method as claimed in 7, where the step for generating the error measure (ERR) comprises a step that:

generates a third property set (C2) using the noise robust mapping (NRM) on information comprising the second property set (S1),
generates the error measure (ERR) by quantifying the difference between the first property set (C1) and the third property set (C2).

10. A computer controlled method as claimed in claim 7, where the authentication decision is generated using information comprising the error measure (ERR) and a control value (V1) associated with both the reference object and the helper data (W1), to generate the authentication decision (D) identifying whether the physical object corresponds with the reference object.

11. A computer controlled method as claimed in claim 7, where the authentication method generates an interim decision (ID) by comparing information derived from the second property set (S1) with information derived from the control value (V1).

12. A computer controlled method as claimed in claim 11, where the authentication method comprises a step for comparing the error measure (ERR) with a predetermined threshold (t), and where information comprising the outcome of said comparison is used to accept or reject the interim decision (ID), resulting in a authentication decision (D) that is identical to, or different from the interim decision (ID) respectively.

13. A computer controlled method as claimed in claim 7, where the authentication method uses information comprising the error measure (ERR) and the first control value (V1) associated with both the reference object and the helper data (W1), to generate a probability measure (P) related to the authentication decision (D).

14. A computer controlled method as claimed in claim 7, where said noise compensating mapping (NCM) is an error correcting code decoder algorithm.

15. A computer controlled method as claimed in claim 7, further comprising a step to acquire an alleged identity.

16. A computer controlled method as claimed in claim 7, further comprising a step for generating a second control value (V2) by applying a one way function h on the second property set (S1), where said second control value (V2) is used to establish a sufficient match between the physical object and the reference object.

17. A computer controlled method of identification of a physical object using both a helper data (W1) and a control value (V1) associated with a reference object, the method according to claim 7, further comprising a step for establishing the identity of the physical object as being identical to that of the reference object.

18. A computer controlled method as claimed in claim 17, where the identification method uses information comprising the error measure (ERR) and the first control value (V1) associated with both the reference object and the helper data (W1), to generate a probability measure (P).

19. A computer controlled method as claimed in 18, where said probability measure (P) is used to establish the identity of said physical object.

20. A computer program product comprising program code means stored on a computer readable medium for performing the method of claim 7 when said program product is run on a computer.

* * * * *